Feb. 14, 1939.  N. M. THOMAS  2,147,583
APPARATUS FOR MOLDING COMPOSITE FROZEN CONFECTIONS
Filed May 3, 1937   2 Sheets-Sheet 1
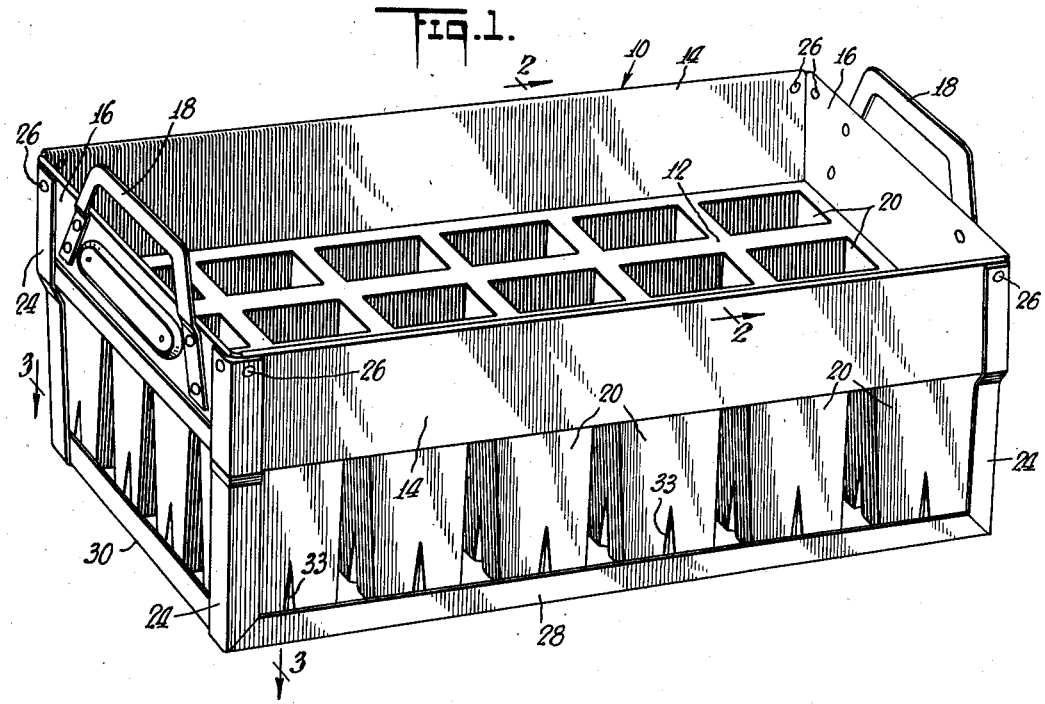
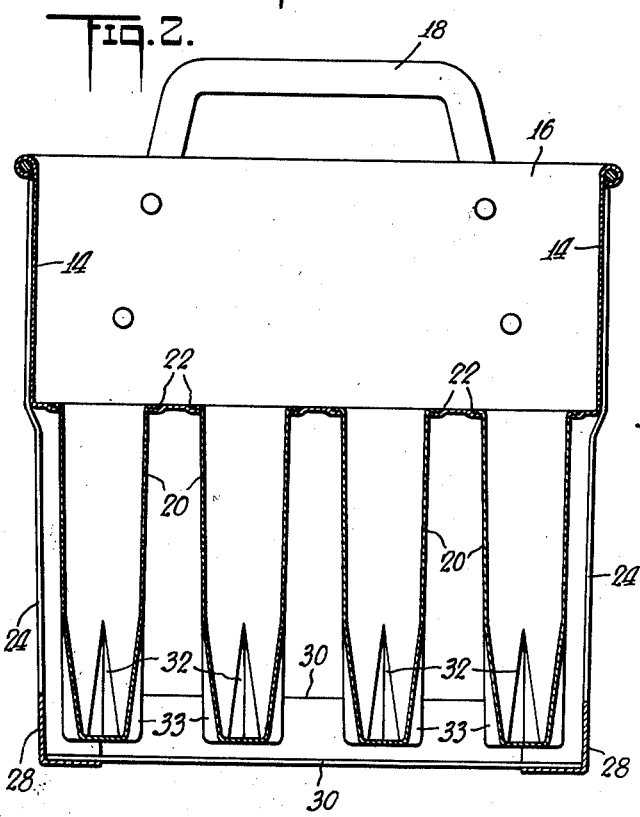
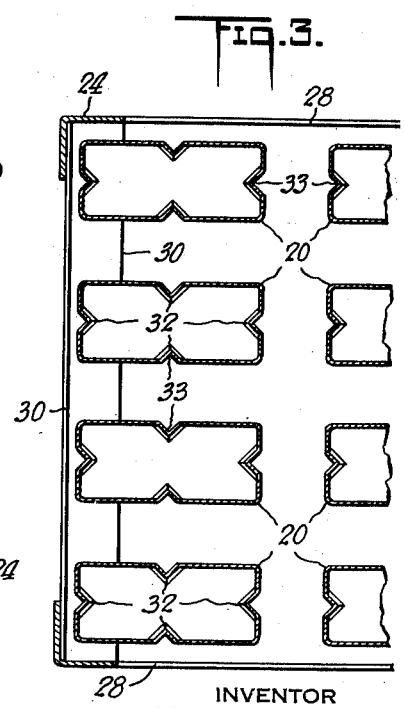
INVENTOR
Norman M. Thomas
BY
ATTORNEY Feb. 14, 1939. N. M. THOMAS 2,147,583
APPARATUS FOR MOLDING COMPOSITE FROZEN CONFECTIONS
Filed May 3, 1937 2 Sheets-Sheet 2
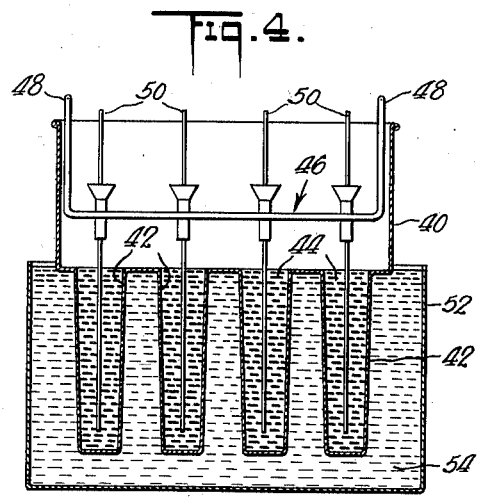
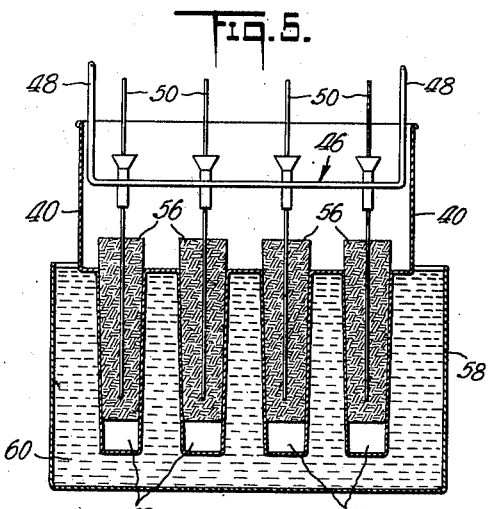
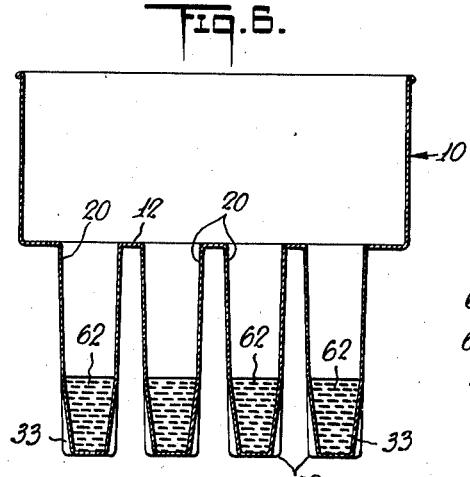
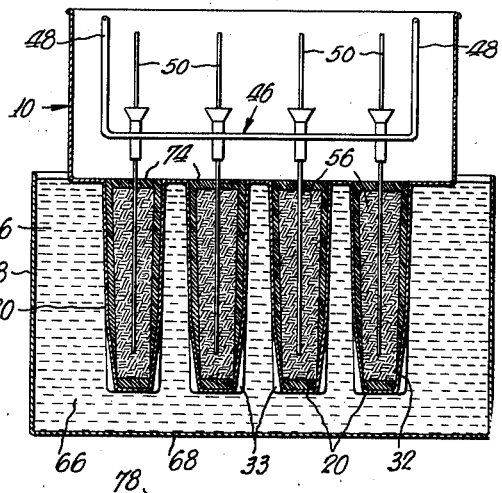
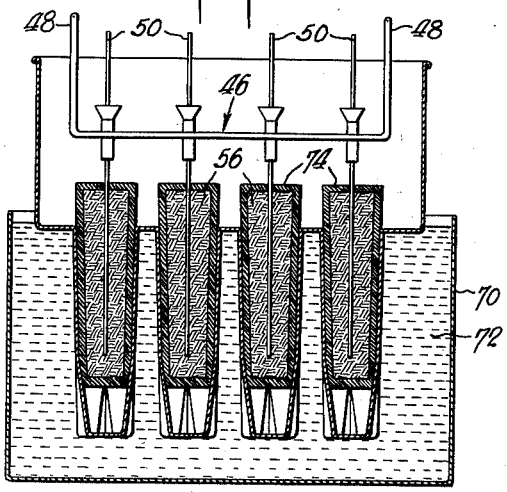
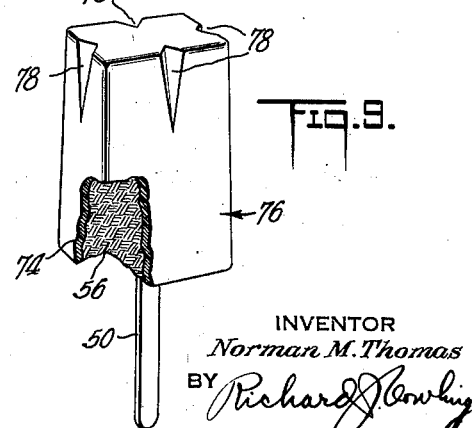
INVENTOR
Norman M. Thomas
BY
ATTORNEY Patented Feb. 14, 1939

2,147,583

UNITED STATES PATENT OFFICE 2,147,583

APPARATUS FOR MOLDING COMPOSITE FROZEN CONFECTIONS

Norman M. Thomas, Brooklyn, N. Y., assignor to Joe Lowe Corporation, New York, N. Y., a corporation of Delaware Application May 3, 1937, Serial No. 140,375

6 Claims. (Cl. 107—19)

The present invention relates to apparatus for forming, refrigerating and harvesting composite frozen confectionery products, and it has particular relation to apparatus adapted to enrobe a separately formed inner core of one substance with a uniform outer layer of another substance, or of enrobing a separately formed inner core of one substance with an outer layer of the same substance of another flavor and of a contrasting color.

An object of the present invention is to provide a simple and efficient molding apparatus, which is highly sanitary and of an inexpensive construction, with means for accurately and positively positioning a preformed smaller separately molded core in spaced relation to the inner walls of a larger mold cavity.

Another object of the invention is to provide a mold having a plurality of spaced dependent mold cavities for simultaneously forming, refrigerating and harvesting a plurality of confectionery products with individual means for accurately spacing an inner core with respect to the inner walls of said cavities.

A further object of the invention is the provision of simple and efficient molding apparatus having means formed integrally of its respective mold cavities for properly spacing and positioning a separately formed frozen core therein.

Another object of the invention is to provide a simple and efficient molding apparatus, which is easily cleaned, for simultaneously positioning a separately formed frozen core therein and for forming a novel and attractive embellishment in the outer enrobing layer, thereby enhancing the appearance of the composite confectionery product.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawings, forming a part hereof, in which:—

Fig. 1 is a perspective view of a mold structure, having a plurality of spaced individual depending mold cavities made in accordance with the principles of my invention;

Fig. 2 is a cross-sectional view of the mold structure shown in Fig. 1, the same being taken along the line 2—2 thereof, and looking in the direction of the arrows;

Fig. 3 is a fragmentary sectional view of the mold structure shown in Fig. 1, the same being taken along the line 3—3 thereof, and looking in the direction of the arrows;

Fig. 4 is a cross-sectional view of a second mold structure, having a plurality of spaced depending conventional mold cavities filled with unfrozen edible material, and having a portable handle stick centering carrier positioned thereover for centering the individual handle sticks in the unfrozen material of each mold cavity, the mold structure being shown positioned within a brine freezing tank to illustrate the step of freezing and separately forming the inner core of the composite confectionery product;

Fig. 5 is a cross-sectional view of the mold structure illustrated in Fig. 4, showing the same positioned in a defrosting tank, and illustrating the manner of simultaneously removing a plurality of the inner frozen cores from their respective mold forming cavities;

Fig. 6 is a cross-sectional view of the mold structure illustrated in Fig. 1, showing the same partially filled with the outer enrobing material in a liquid or semi-plastic form;

Fig. 7 is a cross-sectional view of the mold structure shown in Fig. 6, illustrating the final disposition of the inner cores formed in Fig. 5 by immersing the same in and thereby displacing the enrobing material, and showing the manner in which said cores engage the individual spacing means of the larger mold cavities and are supported thereby to maintain an accurate and positive spaced relation to the inner surfaces thereof;

Fig. 8 is a cross-sectional view of the mold structure and contents shown in Fig. 7, showing the same positioned within a defrosting tank of warm water, and illustrating the manner in which the plurality of confectionery products are simultaneously removed from their individual mold cavities by means of the portable stick-centering carrier; and Fig. 9 is a perspective view of one of the completed composite frozen confectionery products, with parts broken away to show the uniformity of the outer coating or enrobing material.

Referring now to the drawings, and particularly Figs. 1 to 3 thereof, there is shown in Fig. 1 a mold structure 10, consisting of a mold pan 12, having upstanding sidewalls 14 and end walls 16, the latter being provided with handles 18 for raising and transporting the mold structure 10 as desired. The mold pan 12 has a plurality of individual open-top depending mold cavities 20, which are joined and formed integrally with the mold pan 12 by spot-welding, soldering or other suitable means as indicated at 22, and which are adapted to receive liquid, semi-frozen or semi-plastic material to be frozen.

The mold structure 10 is suitably braced at each corner by angle iron uprights 24, which are soldered or spot-welded to the abutting ends of the side and end walls 14 and 16, respectively, and which are reinforced adjacent the top by suitable rivets 26. An angle iron brace rod or runner 28 extends longitudinally along each side of the mold structure 10, and is mounted by spot-welding or other suitable means to the lower ends of the uprights 24, which project slightly below the bottoms of the mold cavities 20. The runners 28 are rigidly connected transversely of the mold structure 10 at each end thereof by suitable angle iron brace rods 30 by spot-welding or other suitable means. The runners 28 and brace rods 30 provide a suitable protective structure for the depending mold cavities 20, and also provide a supporting structure upon which the mold structure 10 is adapted to rest or to be moved by sliding along tracks of a conventional brine tank, the floor, table or other supporting surface.

The extreme lower closed ends of the individual mold cavities 20 are provided with spaced inwardly projecting ribs 32 extending from the closed bottom end upwardly for a distance approximately one-third of the length of the cavities. It will be noted that the portion of the ribs 32 adjacent the bottom of the cavities 20 is of the greatest dimensions, and that the ribs 32 decrease in size uniformly as they extend upwardly until they are merged into the sidewalls of the mold cavities 20. One convenient method of forming these ribs 32 inwardly of the mold cavities is by distending or stamping the sidewalls of the mold cavities 20 from the outer surface thereof inwardly to form indentations 33, which will in turn cause similarly shaped protuberances or ribs 32 on the inside surfaces of said cavities, as best shown in Fig. 3. However, various other ways may be used to accomplish the same result, to-wit: by building up the ribs 32 on the inside walls of the mold cavities 20 by soldering or welding the desired shaped rib thereto, or by placing and fitting a spider insert member (not shown) in the lower ends of the molds.

Referring now to Figs. 4 to 9, inclusive of the drawings, there is shown the various steps in the process of simultaneously forming, refrigerating and harvesting a plurality of composite frozen confectionery products with the mold constructed in accordance with the principles of my invention.

In Fig. 4 there is shown a second conventional mold structure 40, having a plurality of depending mold cavities 42, which are smaller in all dimensions than the cavities 20 of my improved mold structure 10, which are filled with an edible substance 44 to be frozen, such as flavored liquid syrup, semi-frozen water-ice, ice milk, ice cream, frozen custard and the like. A conventional portable carrier and stick-centering device 46, provided with handle members 48, is shown positioned over the cavities 42 of the mold structure 40, containing a plurality of fixed removable handles 50 suitably spaced so as to position one handle 50 centrally of each mold cavity 42. The mold structure 40 and contents are shown positioned in a conventional brine refrigerating tank 52, having circulating brine 54. The mold structure 40 is permitted to remain in the brine 54 of the tank 52 until the substance 44 is frozen and formed into a core 56 and bonded to the immersed end of the handle 50, as best shown in Fig. 5.

Thereupon, the mold structure 40 is removed from the brine freezing tank 52 and momentarily immersed in a defrosting tank 58, containing warm water 60, as shown in Fig. 5, which melts the bond formed between the frozen material 56 and the inner sides of the mold cavities 42, whereupon the confectionery cores 56 may be then simultaneously removed from the mold structure 40 by means of the portable carrier 46 and the protruding ends of the handles 50.

As shown in Fig. 6, the mold cavities 20 of the mold structure 10 are now partially filled with an unfrozen different material or substance 62, which may be any one of the substances heretofore mentioned or the same as the substance 44 but of a different flavor and of a contrasting color. The amount of material 62 to be placed in the mold cavities 20 depends upon the difference in the cubical dimensions of the mold cavities 20 and the mold cavities 42 of the mold structures 10 and 40 respectively.

As shown in Fig. 7, the frozen confectionery cores 56 are now positioned by means of their handles 50 and the portable carrier 46 in the mold cavities 20 of the mold structure 10, which has the same central spacing arrangement as the mold cavities 42 of the mold structure 40 and the handles 50 of the carrier 46. The frozen cores 56 are immersed in the fluid substance 62 until the lower ends thereof engage and are supported by the spacing means or ribs 32. The ribs 32 prevent the frozen cores 56 from contacting the bottom or the adjacent lower sidewalls of the mold cavities 20, thereby insuring proper spacing and/or positioning of the cores 56 axially of the mold cavities 20. The ribs 32 are sufficiently long to provide a suitable support and positioning means to maintain the extreme upper portion of the cores 56 in proper spaced alignment with the upper ends of the mold cavities 20, and the diminishing taper facilitates ready removal of the frozen mass from the mold cavities 20 during the withdrawal operation, as best depicted in Fig. 8.

The mold structure 10 and contents is then positioned in the refrigerated brine 66 of the tank 68 until the enrobing substance 62 is entirely frozen and bonded to the inner core 56. Thereupon, the mold structure 10 is removed from the brine tank 68 and momentarily positioned or dipped in a defrosting tank 70 containing warm water 72 to melt and thereby break the bond formed between the outer surface of the frozen enrobing substance 74 and the inner surfaces of the mold cavities 20. The finished confectionery products 76 are then simultaneously removed from the mold cavities 20 of the mold structure 10 by means of the portable carrier 46, and, upon being released therefrom, are ready to be bagged, boxed, etc. for distribution and sale.

Obviously the present invention may be used to manufacture a confectionery product, similar to the product 76, but without a handle member embedded therein, by merely using a conventional spur plate device, such as that shown and described in United States Letters Patent No. 2,056,127, issued September 29, 1936, to Herman Siemund, instead of the portable stick centering carrier 46 shown herein.

It will be noted that the spacing ribs 32 of the mold cavities 20 form indentations 78 in the finished confectionery product 76, which are of their greatest depth adjacent the top side thereof and which gradually diminish as they extend downwardly of the confectionery body toward the end containing the handle member 50. These indentations 78, will of course be of the identical shape of the spacing means 32 of the mold cavities, and provide a novel and distinctive appearance to the finished products, enhancing their esthetic features and rendering them more attractive and saleable. The novel appearance of the confectionery product 76, shown in Fig. 9 of the drawings herein, forms the basis of my co-pending design application filed on even date herewith under Serial Number D. 69,123 now Letters Patent Design 105,151, issued June 29, 1937.

Although I have only described in detail one form which my invention may assume, it will be readily apparent to those skilled in the art that the invention is not so limited, but that various other modifications may be made therein without departing from the spirit thereof or from the scope of the appended claims.

What I claim is:—

1. A mold structure comprising an open-top mold cavity having a plurality of perimetrically spaced inwardly projecting longitudinal ribs for engaging and supporting a pre-formed core of smaller cross-sectional dimensions than said cavity in spaced relation thereto with respect to the sidewalls and bottom thereof, said ribs extending upwardly from the bottom and contiguous to the sidewalls thereof and being tapered outwardly and away from each other.

2. A mold structure comprising an open-top mold cavity having a plurality of perimetrically spaced inwardly projecting longitudinal ribs for engaging and supporting a pre-formed core of smaller cross-sectional dimensions than said cavity in spaced relation thereto with respect to the sidewalls and bottom thereof, said ribs extending upwardly from the bottom and contiguous to the sidewalls thereof and being tapered upwardly and outwardly away from the bottom and each other.

3. A mold structure comprising an open-top mold cavity having a plurality of perimetrically spaced inwardly projecting longitudinal ribs for engaging and supporting a pre-formed core of smaller cross-sectional dimensions than said cavity in spaced relation thereto with respect to the sidewalls and bottom thereof, said ribs being formed integrally with the sidewalls of said cavity and having their greatest thickness adjacent the bottom thereof, said ribs being tapered upwardly and thereby decreasing in size until they merge with the sidewalls of the mold cavity at a point intermediate the ends thereof.

4. A mold structure comprising an open-top mold cavity having a plurality of perimetrically spaced inwardly projecting longitudinal indentations extending from a point intermediate the sides thereof to the bottom, said indentations gradually increasing in width and depth as they extend downwardly whereby upwardly tapered integral ribs are formed in the sidewalls of said cavity for engaging and supporting a pre-formed core of smaller cross-sectional dimensions than said cavity in spaced relation with respect to the sidewalls and bottom thereof.

5. A mold structure comprising an open-top mold cavity tapered inwardly and downwardly toward the bottom thereof having a plurality of perimetrically spaced inwardly projecting oppositely tapered longitudinal ribs for engaging and supporting a downwardly tapered pre-formed core of smaller cross-sectional dimensions than said mold cavity in spaced relation thereto with respect to the sidewalls and bottom thereof, said oppositely tapered ribs being integrally formed with the sidewalls of said cavities and having their greatest thickness adjacent the bottom thereof.

6. A mold structure comprising an open-top mold cavity having a plurality of perimetrically spaced inwardly projecting downwardly tapered longitudinal indentations in the outer sidewalls thereof, said indentations extending from a point intermediate the sides thereof longitudinally downwardly and gradually increasing in depth until reaching a maximum depth adjacent said bottom portion of said mold cavity whereby inwardly and upwardly tapered longitudinal ribs are formed in the sidewalls of said cavity for engaging and supporting a pre-formed core of smaller cross-sectional dimensions than said cavity in spaced relation with respect to the sidewalls and bottom thereof.

NORMAN M. THOMAS.